W. H. KEMPTON.

INSULATOR.

APPLICATION FILED SEPT. 22, 1909.

Reissued Feb. 11, 1913.

13,526.

WITNESSES:

H. E. Cooper

M. C. Williams

INVENTOR

Willard H. Kempton

BY Beach & Fish

ATTORNEYS.

UNITED STATES PATENT OFFICE.

WILLARD H. KEMPTON, OF MANSFIELD, OHIO, ASSIGNOR TO THE JOHNS-PRATT COMPANY, OF HARTFORD, CONNECTICUT, A CORPORATION OF CONNECTICUT.

INSULATOR.

13,526. Specification of Reissued Letters Patent. Reissued Feb. 11, 1913.

Original No. 904,069, dated November 17, 1908, Serial No. 406,640½. Application for reissue filed September 22, 1909. Serial No. 519,109.

*To all whom it may concern:*

Be it known that I, WILLARD H. KEMPTON, a citizen of the United States, residing at Mansfield, in the county of Richland and State of Ohio, have invented certain new and useful Improvements in Insulators, of which the following is a specification.

My invention relates to improvements in those devices which are used to insulate electrically conducting wires or cables, especially that class of devices known as strain insulators which are employed in railway and power systems for the purpose of electrically disconnecting, while mechanically joining, guy, anchor, span, suspension and conductor wires and cables, from poles, bridges or other structures, or of being interposed between wire and cable sections that are to be electrically insulated from each other.

The object of the invention is to produce an insulator of this nature which is very simple to construct and assemble, which has great mechanical strength and which is of high electrical efficiency whereby it is of particular service in high tension electrical systems.

The embodiment of the invention that is illustrated has means which are adapted to be easily and quickly secured to the ends of the wire or cable to be electrically disconnected, or the end of the wire or cable and the support to which the end of the wire or cable is to be mechanically secured and insulated, and simple means which not only thoroughly insulate the attaching means, but are so constructed and arranged that they will sustain great strain and stress without danger of rupture or damage and consequent mechanical and electrical weakening of the structure.

Figure 1:
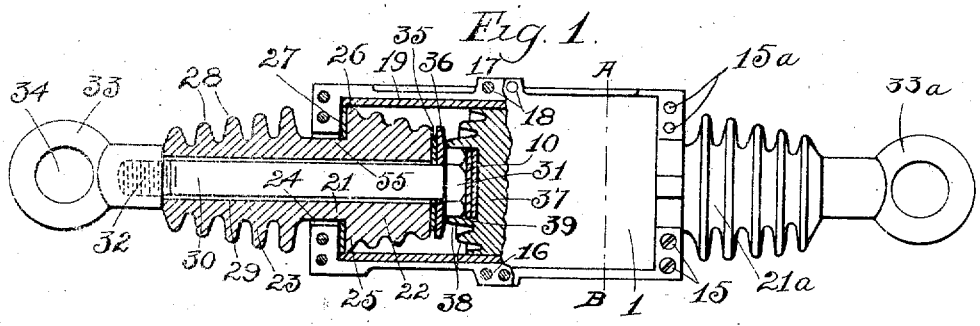
Figure 2:
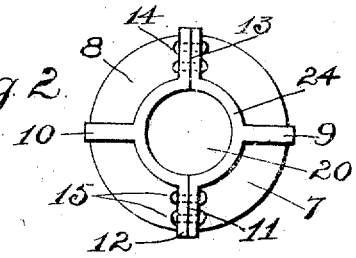
Figure 4:
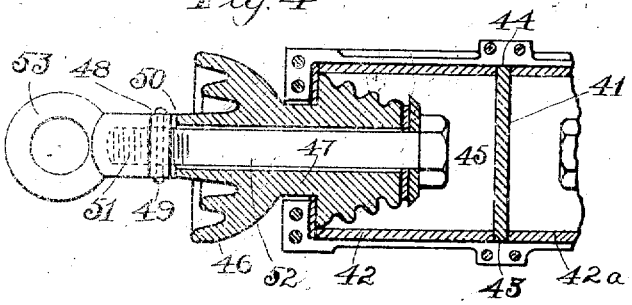
Figure 3:
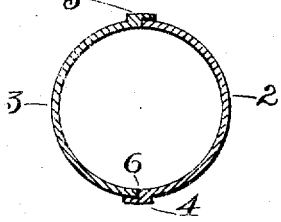
Figure 5:
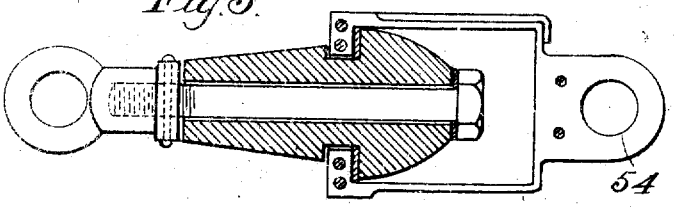

Figure 1 of the accompanying drawings shows a side view of my improved insulator with a part cut away to expose the interior. Fig. 2 shows a view of the end of the inclosing shell. Fig. 3 is a transverse section through the shell on the line A—B on Fig. 1. Fig. 4 shows a section of a modification of the device. Fig. 5 shows another modification of the device.

The shell 1 which is made of metal is shown as formed of two semi-cylindrical sections 2 and 3, but it could be formed of more than two sections if desired. The longitudinal edge of the section 2 has a flange 4 and the longitudinal edge of the section 3 has a similar flange 5. These flanges are so shaped that when the sections are put together the flange on one will overlap the edge of the other and thus not only add strength but so cover the joints 6 as to prevent the entrance of moisture into the interior and thus render the shell practically waterproof.

The ends of the shell sections shown are provided with webs 7 and 8 having radial ribs 9 and 10 and flanges, 11, 12, 13 and 14. When the sections are assembled the webs come adjacent to each other and are secured together by rivets or screws 15. When the rivets or screws are set, the sections with the longitudinal flanges overlapping are securely held together in such manner as to form a shell or housing, which is very tight and also has great mechanical strength. On the exterior of the shell sections and near the middle are upwardly extending flanges 16 and 17 that are provided with holes through which are passed rivets or screws 18 for the purpose of further securing the shell sections together. Within the shell and approximately having the same diameter as the cylindrical opening is a lining or tube 19 of insulating material which is designed to prevent the passage of electric current to the shell from the interior.

Through each end of the shell is an opening 20 and before the shell sections are laid together and secured, in each of these openings there is placed a block 21 preferably formed of porcelain or other hard, vitreous electrically non-conducting substance. Between the inner an douter ends of the block is a neck 55 that lies within the opening 20 and is embraced by the walls 24 of said opening. When the block 21 is in position and the shell sections are secured together the shoulders 25 and 26 of the block butt against the inner face of the end of the shell. In the ordinary construction of this insulator a corresponding member 21ª is arranged at the opposite end of the shell. A washer 27 of lead, asbestos or other suitable material may be arranged between the shoulders 25 and 26 and the end of the shell for the purpose of forming a cushion or packing. The surface of the insulating block 21 is preferably provided with corrugations or annular ribs as shown at 28.

The insulating block has a central longitudinal opening 29 through which passes a bolt 30 that has its head 31 inside of the shell and its threaded end 32 outside of the shell beyond the end of the insulating block. An internally threaded coupling member 33 with a loop or eye 34 is screwed upon the threaded end of the bolt for the purpose of providing means for securing the device to the end of a wire, cable or other part.

Between the head of the bolt and the end of the insulating block there may be interposed a washer 35 formed of lead, asbestos or other material for the purpose of cushioning the parts and a washer 36 formed of metal, such as steel, for the purpose of distributing the load over the entire surface of the end of the insulating block. It will be seen, therefore, that the conical inner end of the insulating block is cushioned between the end of the shell and the head of the bolt. The insulating block 21ª in the opposite end of the shell of the form first shown is constructed, located and arranged in all respects like the block 21. The entire load or strain brought upon this structure is sustained in the first instance by the bolts which are held together by the shell from which they are thoroughly insulated by the inner ends of the vitreous blocks between the heads of the bolts and the inner ends of the shells. The shoulders 25 and 26 formed on the blocks are of such width and strength that they effectively resist any tendency to shear under the strain of the load, and as they are subjected to compressional strains they are not liable to become broken or injured so as to crumble away and allow the metal parts to come into contact. The neck 55 provided in the insulating block is formed between two portions of the block which are of greater diameter than the opening 20 in the end of the shell, as shown.

Within the shell and between the inner ends of the insulating blocks there may be interposed an insulating block 37 formed of one or more pieces having its opposite ends provided with corrugations 38 or otherwise shaped to provide suitable insulation. This member on each side preferably has a recess 39 to receive the head of the bolt, a packing washer 40 of lead, asbestos or other material being interposed between said bolt and the bottom of the recess. This insulating block 37 is preferably entirely within the tubular insulating lining 19. The corrugations formed on these blocks of insulating material may be of any desired depth consistent with the required strength, but the greater the depth the greater will be the distance over which electric current must pass in order to reach the metallic parts.

In the form shown in Fig. 4 an insulating disk 41 is substituted for the insulating block 37 shown in the first form. In this construction the lining is formed in two sections 42 and 42ª and the disk is interposed between their inner ends as appears at 43 and 44, being held in position thereby. With this construction an air gap is left between the head of the bolt and the insulating disk thus insuring a higher degree of insulation. The external portion 46 of the protruding insulating block 47 in this form of insulator is shown as bell-shaped, having a corrugated or annularly flanged end surface in order to increase the insulating efficiency. In the form shown in Fig. 1 the head of the bolt so fits the recess in the intermediate insulating block that the bolt cannot turn when the coupling eye is screwed upon the outer end. In the form shown in Fig. 4 a nut is placed upon the threaded end 51 of the bolt 52 against the packing 50, and a pin 49 is driven through the nut and bolt. When the coupling 53 is being screwed on, this nut can be held by a wrench or other tool so as to prevent the bolt from turning.

In the form shown in Fig. 5 the corrugations or annular flanges are omitted from the insulating block, and in this form but a single insulating block is shown. In this form, which is more especially adapted to low voltages, the insulating lining is omitted as well as the intermediate insulating block or disk. The coupling member which is screwed upon the threaded end of the bolt may have an eye, hook or other common means for the attachment of a wire or cable.

Any of the forms of insulators shown may be constructed with oppositely disposed insulating blocks as appears in Figs. 1 and 4 or with a single insulating block as shown in Fig. 5. If but a single insulating block is used, the casing is approximately only half as long as when two insulating blocks are used. In this form one end of the casing is constructed so as to be completely closed, and the closed end is provided with an eye or other form of coupling as shown at 54 in Fig. 5.

It will be noted that in each of the forms shown, the portion of the insulating block which projects outside of the shell is wider than the opening 20 in the head of the shell, thereby increasing considerably the insulating effect at that point. Moreover, the construction described permits me to provide the insulating block with an exterior portion at least approximating in size the portion within the shell.

The invention claimed is:—

1. A strain insulator having a cylindrical shell formed of longitudinal sections, said sections having longitudinally extending flanges that overlap and protect the joints between the sections, means for securing the sections together, an insulating block extending through an end of the shell, said block being larger in diameter in the interior of the shell than the opening through which it extends, a bolt extending through the block, said bolt having a head in the interior that is larger than the diameter of the opening through which it extends, and means on the bolt on the exterior of the shell for the attachment of a wire or cable, substantially as specified.

2. A strain insulator having a cylindrical shell formed of longitudinal sections, said sections having longitudinally extending flanges that overlap and protect the joints between the sections, means for securing the sections together, insulating blocks extending through the ends of the shell, said blocks being larger in diameter in the interior of the shell than the openings through which they extend, bolts extending through the blocks, said bolts having heads in the interior that are larger than the diameter of the openings through which they extend, and means on the bolts on the exterior of the shell for the attachment of wires or cables, substantially as specified.

3. A strain insulator having a cylindrical shell formed of longitudinal sections, means for securing the sections together, blocks of insulating material extending through openings in the ends of the shell, said blocks being larger in diameter in the interior of the shell than the openings through which they extend, bolts extending through the blocks, said bolts having heads in the interior larger in diameter than the openings through which they extend, means on the bolts on the exterior of the shell for the attachment of wires or cables, and an insulating piece extending across the interior of the shell and isolating the bolts, substantially as specified.

4. A strain insulator having a cylindrical shell formed of longitudinal sections, means for securing the sections together, an insulating lining for the shell, vitrified insulating blocks extending through the ends of the shell, said blocks having their interior sections larger in diameter than the diameter of the openings through which they extend, bolts extending through the blocks, said bolts having heads on the interior larger than the openings through which they extend, and means on the bolts on the exterior of the shell for the attachment of wires or cables, substantially as specified.

5. A strain insulator having a cylindrical shell formed of longitudinal sections, means for securing the sections together, vitrified insulating blocks extending through the ends of the shell, said blocks having their interior sections larger in diameter than the openings through which they extend, bolts extending through the blocks, said bolts having heads in the interior that are larger in diameter than the openings through the blocks, means on the bolts on the exterior of the shell for the attachment of wires or cables, and an insulating block fitting the interior of the shell near the middle, said block having recesses which fit the heads of the bolts and prevent them from turning, substantially as specified.

6. A strain insulator comprising a metallic casing formed of overlapping parts and being flanged at its ends to leave an opening therethrough, that is smaller in diameter than the diameter of the interior of the casing an insulating lining in said casing, an insulating member disposed transversely in said casing, oppositely disposed insulating members having an enlarged portion within said casing and a reduced portion extending outwardly through said casing, said oppositely disposed members being hollow, and a bolt extending through each of said oppositely disposed members and having a head upon its inner end, and an eye on its outer end, substantially as specified.

7. A strain insulator comprising a casing formed of semi-circular sections adapted to overlap at their edges and being flanged at their ends to leave an opening therethrough, that is smaller in diameter than the diameter of the interior of the casing, a transversely disposed insulating member in said casing, an insulating lining in said casing, and a second insulating member having an enlarged portion arranged within said casing to engage the flanges thereon and a reduced portion disposed in said opening and extending outwardly therefrom, said second insulating member being hollow, a bolt extending therethrough and provided with a head upon its inner end, a washer and a cushion member on said bolt between said head and the inner end of said second insulating member, an eye on the outer end of said bolt, said second insulating member being formed with corrugations upon its internal portion and also upon its external portion, substantially as specified.

8. A strain insulator comprising a cylindrical casing formed of semicircular members overlapping throughout a portion of their length, and formed at their ends to leave a central opening therethrough, that is smaller in diameter than the diameter of the interior of the casing an insulating lining in said casing, oppositely disposed insulating members supported in said casing and projecting through the end openings thereof, a supplementary insulating member within said casing between the inner ends of said insulating members, said protruding insulating members having a central longitudinal bore, bolts inserted therethrough having heads adapted to engage the inner ends of said protruding insulating members, and positioned in recesses in said supplementary insulating member to prevent the turning of said bolts, packings interposed between said bolt heads and said insulating members, and a member carried at the outer extremity of said bolts for attaching said insulator to a wire or cable to be supported, substantially as specified.

9. A strain insulator comprising a casing formed of semicircular sections having their side edges adapted to overlap throughout a portion of their length and their ends provided with webs adapted to be secured together and leave an opening therethrough, means for securing said sections together at their ends and sides, oppositely disposed insulating members supported within said casing and protruding through the end openings therein, means carried by said members for attaching the same to a cable or wire or supporting structure, an insulating member within said casing interposed between said first mentioned insulating members, all said insulating members having corrugations, and an insulating lining in said casing surrounding said insulating members, substantially as specified.

10. A strain insulator, comprising a casing having an end opening, a bolt extending into said casing through said opening, and an insulating block separates from said bolt and embracing the same, partially within the casing and partially without the casing, the exterior portion of said block being larger than said end opening; substantially as described.

11. A strain insulator, comprising a casing having an end opening, a bolt extending into said casing through said end opening, and an insulating block embracing said bolt, partially within the casing and partially without the casing, said block being provided with an intermediate reduced neck portion within said end opening, and the portion of said block outside of the casing approximating in size the portion inside the casing; substantially as described.

12. A strain insulator, comprising a substantially cylindrical casing, divided longitudinally in sections, the said casing having an end opening, a bolt extending into said casing through said end opening, and having a head on its inner end, and an insulating block separate from said bolt and embracing the same, partially within and partially without the casing, said block being provided intermediate of its ends with a reduced neck portion within the end opening of the casing; substantially as described.

13. A strain insulator, comprising a substantially cylindrical casing, divided longitudinally in sections, the said casing having an end opening, a bolt extending into said casing through said end opening, and having a head on its inner end, and an insulating block separate from said bolt and embracing the same, partially within and partially without the casing, said block being provided intermediate of its ends with a reduced neck portion within the end opening of the casing, the portion of said block outside of the casing being of greater diameter than said end opening, and approximating in size the portion of the block at the interior of the casing; substantially as described.

In testimony whereof, I affix my signature in the presence of two witnesses.

WILLARD H. KEMPTON.

Witnesses:
H. A. Allen,
W. S. Andrews,